US007921933B2

(12) United States Patent
Hamano et al.

(10) Patent No.: US 7,921,933 B2
(45) Date of Patent: Apr. 12, 2011

(54) IMPACT DRIVING TOOL

(75) Inventors: Terufumi Hamano, Tokyo (JP); Akira Teranishi, Tokyo (JP); Kazuya Sakamaki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 58 days.

(21) Appl. No.: 12/470,055

(22) Filed: May 21, 2009

(65) Prior Publication Data

US 2009/0288851 A1 Nov. 26, 2009

(30) Foreign Application Priority Data

May 26, 2008 (JP) ................................ 2008-137034
May 26, 2008 (JP) ................................ 2008-137035
May 26, 2008 (JP) ................................ 2008-137036

(51) Int. Cl.
*B23B 45/16* (2006.01)

(52) U.S. Cl. ............ 173/122; 173/48; 173/91; 173/128; 173/205

(58) Field of Classification Search .................. 173/122, 173/48, 91, 128, 205
See application file for complete search history.

(56) References Cited

U.S. PATENT DOCUMENTS 3,828,863 A * 8/1974 Bleicher et al. ................. 173/48
4,066,136 A * 1/1978 Wanner et al. .................. 173/48
4,349,074 A * 9/1982 Ince ............................... 173/48
4,508,180 A 4/1985 Klueber
4,770,254 A * 9/1988 Kominami .................... 173/109
5,842,527 A * 12/1998 Arakawa et al. ................ 173/48
6,192,996 B1 * 2/2001 Sakaguchi et al. .............. 173/48
6,196,330 B1 * 3/2001 Matthias et al. ................ 173/48
6,557,648 B2 * 5/2003 Ichijyou et al. ................. 173/48
7,325,624 B2 * 2/2008 Yamazaki ....................... 173/48

FOREIGN PATENT DOCUMENTS

GB 2 114 496 A 8/1983
JP 2004-167638 6/2004
WO WO 03/024671 A2 3/2003
WO WO 2007/088821 A1 8/2007

* cited by examiner

*Primary Examiner* — Brian D Nash
(74) *Attorney, Agent, or Firm* — Drinker Biddle & Reath LLP

(57) ABSTRACT

In a driving tool, a diameter of an intermediate member is enlarged to increase a mass of the intermediate member and an outside diameter of a cylinder at a position where the intermediate member is internally provided is enlarged in accordance with the enlarged diameter of the intermediate member. Further, in the driving tool, a bearing thickness of a ball bearing is reduced correspondingly to a dimension of the enlarged outside diameter of the cylinder and a washer is provided at a part where the ball bearing abuts on the cylinder in the forward and backward moving direction thereof.

3 Claims, 12 Drawing Sheets

IMPACT DRIVING TOOL

FIELD OF THE INVENTION

The present invention relates to a driving tool applying an impact force to a bit.

DESCRIPTION OF RELATED ART

Japanese Unexamined Application Publication No. JP-A-2004-167638 discloses a related-art hammer drill that drives and rotates a bit provided on an end of a tool and applies an impact to the bit driven to rotate.

When the hammer drill is used, an operator holds the hammer drill by both hands to carry out a drilling operation. Accordingly, a miniaturization of the hammer drill is highly requested and an improvement of operation efficiency by the miniaturization of the tool is required.

Further, in order to achieve a high operating speed or improve workability in the drilling operation, an improvement of an impact force in the hammer drill is required. For that purpose, a mass of an intermediate member used in a striking mechanism part of the hammer drill is preferably increased to improve the impact force applied to the bit during a striking operation. However, to increase the mass of the intermediate member, since the intermediate member needs to be enlarged, the hammer drill is enlarged.

When the hammer drill is enlarged, a serviceability of the tool is deteriorated to lower the operation efficiency.

SUMMARY OF THE INVENTION

Illustrative aspects of the present invention provide a driving tool having a striking mechanism in which a drilling performance is improved without enlarging the tool.

According to a first aspect of the present invention, a driving tool comprises a main body housing forming the external appearance of the tool, a cylinder provided so as to freely rotate relative to the main body housing by a ball bearing and freely move forward and backward through a slide bearing, a rotation and driving transmitting unit that drives to rotate the cylinder in accordance with a rotating movement of a motor, a forward and backward driving converting unit that converts the rotating movement of the motor into a forward and backward movement in the extending direction of the cylinder by using a reciprocating mechanism, a piston cylinder that is driven to move forward and backward in the extending direction by the forward and backward driving converting unit, a striking member that moves forward and backward in the cylinder in accordance with the forward and backward movement of the piston cylinder and an intermediate member that transmits an impact force by the striking member to a bit provided at the end of the cylinder from an inner part of the cylinder, and is characterized in that the diameter of the intermediate member is enlarged to increase the mass of the intermediate member, the outside diameter of the cylinder at a position where the intermediate member is internally provided is enlarged in accordance with the enlarged diameter of the intermediate member, the thickness of the bearing of the ball bearing is reduced correspondingly to the dimension of the enlarged outside diameter of the cylinder and a washer is provided at a part where the ball bearing abuts on the cylinder in the forward and backward moving direction of the cylinder.

According to a second aspect of the present invention, a driving tool comprises a ball bearing that supports an output shaft of a motor so as to freely rotate, a gear engaging with a toothed wheel directly formed on an end of the output shaft, an intermediate shaft engaging with the gear to be driven and rotated in accordance with the rotation of the output shaft, a rotating and driving unit that rotates and drives a bit provided on the end of the tool in accordance with the rotation of the intermediate shaft and an impact applying unit that applies an impact force to the bit in accordance with the rotation of the intermediate shaft, and is characterized in that a sleeve is fixed to the output shaft and the sleeve is allowed to abut on the front surface part of the ball bearing.

According to a third aspect of the present invention, in a driving tool, an oil seal may be provided in the sleeve.

BRIEF DESCRIPTION OF THE DRAWINGS

FIG. 2A shows a state that a cylinder moves forward to abut on a washer and FIG. 2B shows a state that the cylinder moves backward to form a space between the cylinder and the washer.

DETAILED DESCRIPTION OF EXEMPLARY EMBODIMENTS

Figure 2A:
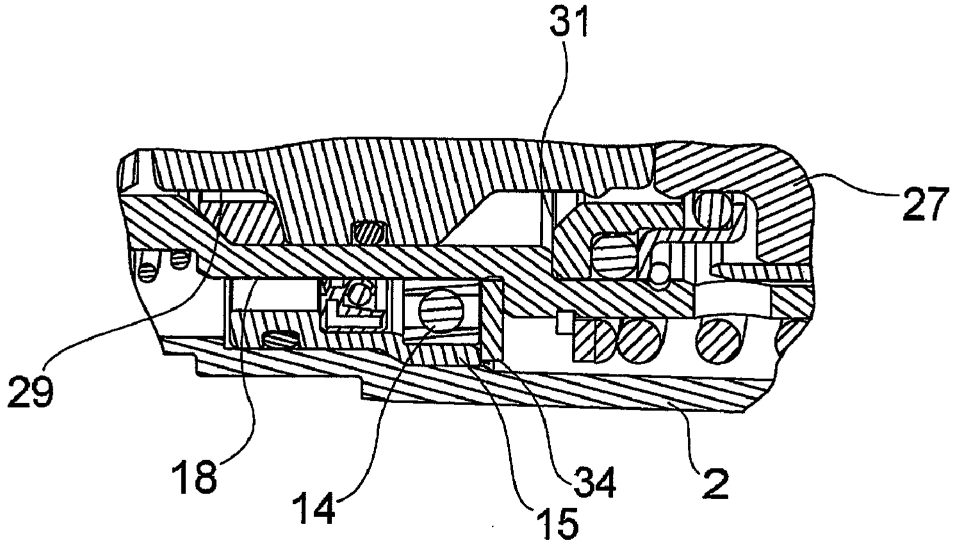
FIGS. 2A and 2B illustrate schematic structures showing that a part A of the hammer drill shown in FIG. 1 is enlarged.
Figure 2B:
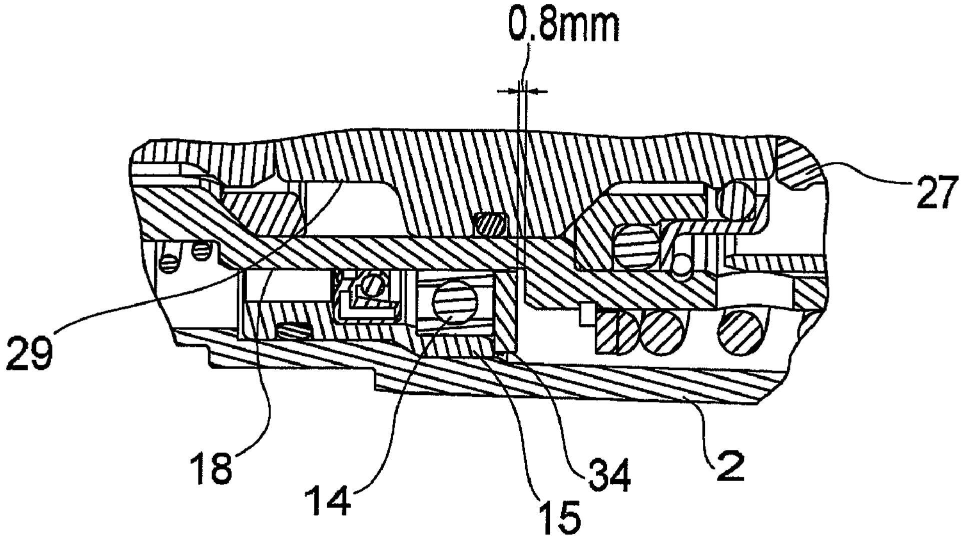
Figure 3:
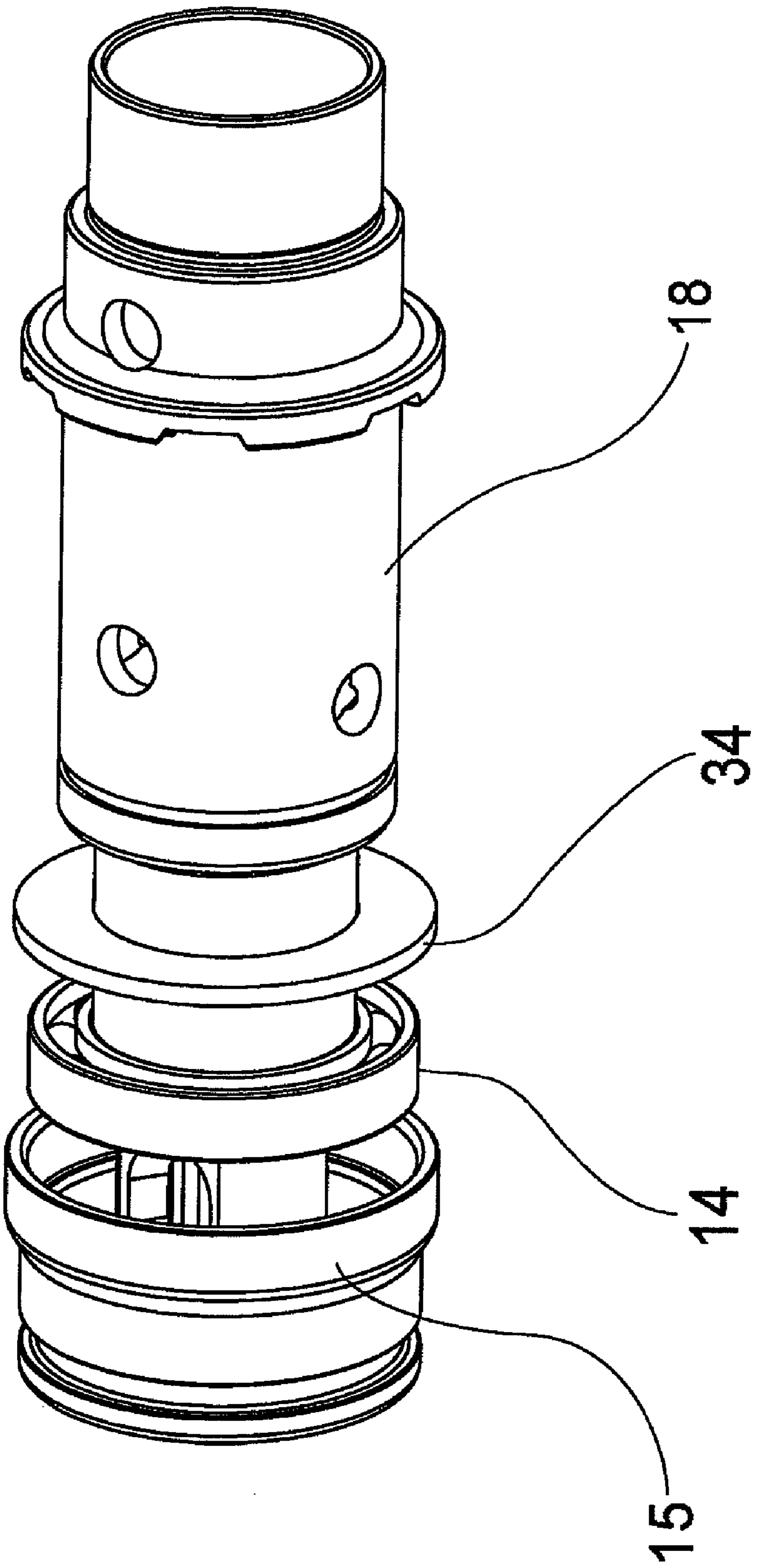
FIG. 3 is a perspective view showing a positional relation of the cylinder, a ball bearing, the washer and a bush in the hammer drill.

Now, a driving tool according to a first embodiment of the present invention will be described below in detail by referring to FIGS. 1 to 3.

Figure 1:
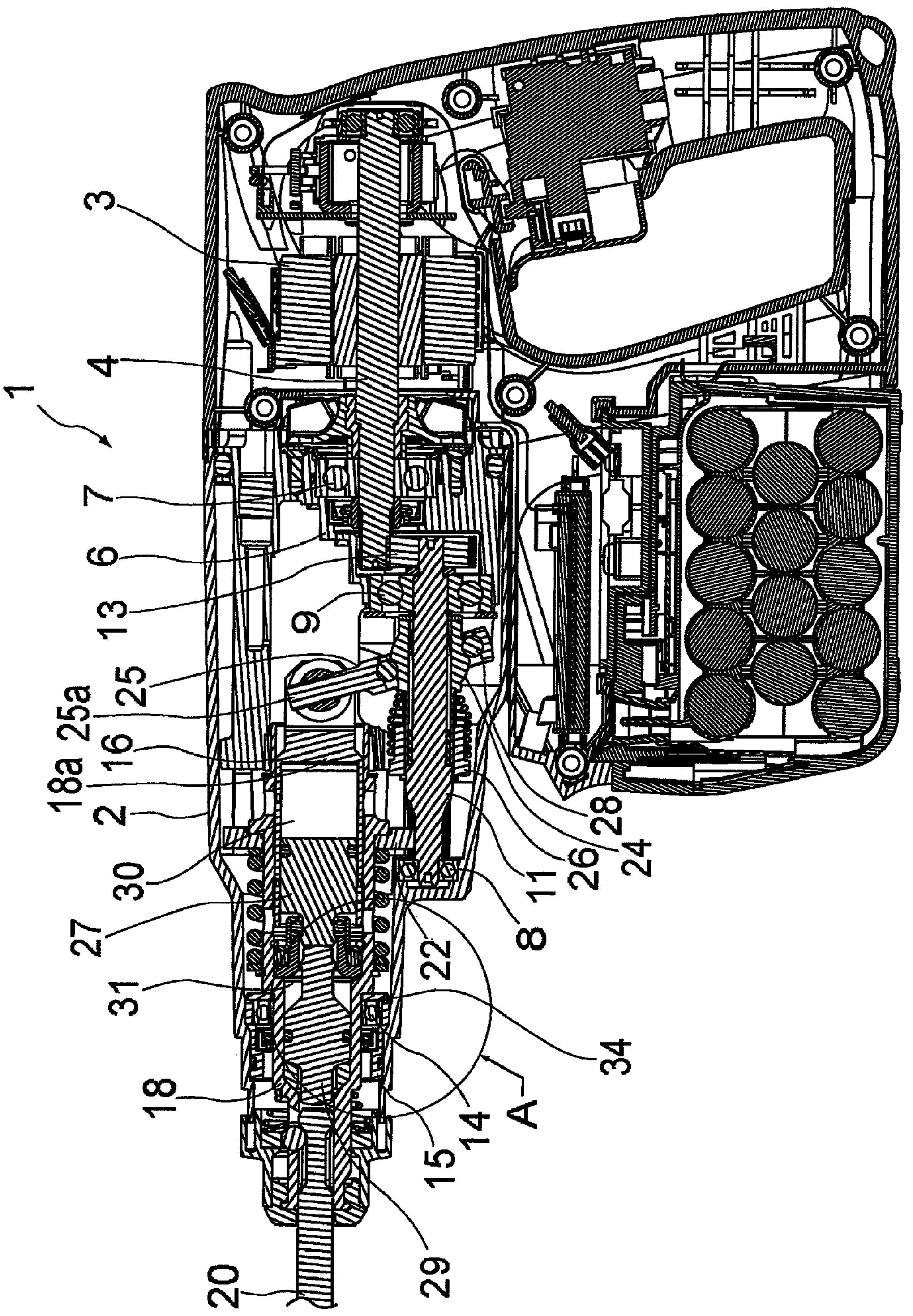
FIG. 1 is a side sectional view showing a hammer drill according to a first embodiment of the present invention.

FIG. 1 is a side sectional view showing a hammer drill 1 as one example of the driving tool according to the first embodiment of the present invention.

In the hammer drill 1, a motor 3 is accommodated in a rear inner part (a right side in FIG. 1) of a main body housing 2. An output shaft 4 of the motor 3 is supported so as to freely rotate relative to an inner housing 6 incorporated in the main body housing 2 through a ball bearing 7.

An intermediate shaft 11 supported through ball bearings 8 and 9 is provided in a front side of the inner housing 6. The intermediate shaft 11 is installed so as to be parallel to the output shaft 4. A first gear 13 is engaged with the rear end part of the intermediate shaft 11. An end part of the output shaft 4 is engaged with the first gear 13. Accordingly, when the output shaft 4 of the motor 3 rotates, the rotation of the output shaft 4 is transmitted to the intermediate shaft 11 through the first gear 13 to rotate the intermediate shaft 11.

In a front side of the inner housing 6 in the main body housing 2, as shown in FIGS. 1 and 2, a cylinder 18 is provided that is supported to freely rotate. The cylinder 18 is permitted to move forward and backward in the main body housing 2 by a ball bearing 14 provided through a bush 15 and a slide bearing 16 provided in the inner housing 6. A bit 20 can be attached to a front part of the cylinder 18.

A second gear 22 provided in a front part of the intermediate shaft 11 is engaged with the cylinder 18. Accordingly, when the intermediate shaft 11 is rotated, the rotation of the intermediate shaft 11 is transmitted to the cylinder 18 through the second gear 22, so that the bit 20 can be rotated and driven in accordance with the rotation of the cylinder 18. The output shaft 4 of the motor 3, the first gear 13, the intermediate shaft 11 and the second gear 22 correspond to a rotation and driving transmitting unit of the present invention.

On the other hand, a boss 24 is freely fitted to the intermediate shaft 11. A connecting arm 25 is attached to an outer periphery of the boss 24. The connecting arm 25 is freely fitted through a steel ball 28 under a state that an axis is inclined. A clutch 26 is provided on a front surface of the boss 24. The clutch 26 is spline-connected to the intermediate shaft 11 and so that the clutch can rotate integrally with the intermediate shaft 11 and further slide in the axial direction. The clutch 26 is provided with a plurality of clutch pawls. The clutch 26 can be engaged with the intermediate shaft 11 and the boss 24 through an engagement by the clutch pawls.

When the clutch 26 is engaged with the boss 24 and the intermediate shaft 11 by using the clutch pawls, the rotation of the intermediate shaft 11 is transmitted to the boss 24 through the clutch 26. Therefore, an arm end 25*a* of the connecting arm 25 provided under a state that the axis is inclined can be moved forward and backward in the extending direction of the cylinder 18 in accordance with the rotation of the boss 24.

On the other hand, when the clutch 26 is disengaged from the boss 24 and the intermediate shaft 11 by the disengagement of the clutch pawls, the rotation of the intermediate shaft 11 is not transmitted to the boss 24, so that a forward and backward movement of the arm end 25*a* of the connecting arm 25 can be stopped. The output shaft 4 of the motor 3, the first gear 13, the intermediate shaft 11, the clutch 26, the boss 24, the steel ball 28 and the connecting arm 25 correspond a forward and backward driving converting unit of the present invention.

The arm end 25*a* of the connecting arm 25 is journaled on a rear end of a piston cylinder 18*a* provided in the cylinder 18. In the piston cylinder 18*a*, a striking member 27 is accommodated so as to freely slide through an air chamber 30. Further, in an inner part of the front end of the cylinder 18 in front of the striking member 27, an intermediate member 29 is accommodated that applies an impact force to the bit 20 in accordance with a collision with the striking member 27. Between the striking member 27 and the intermediate member 29, a partition part 31 is provided that regulates a forward moving position of the striking member 27 and a backward moving position of the intermediate member 29. The diameter of the cylinder 18 located in the intermediate member 29 side is formed to be slightly smaller than the diameter of the cylinder 18 located in the striking member 27 side by taking a part near the partition part 31 as a boundary.

When the arm end 25*a* of the connecting arm 25 starts a forward and backward movement, the driving movement of the piston cylinder 18*a* is started to start a sliding movement of the striking member 27 in accordance with the forward and backward movement of the arm end 25*a*. When the striking member 27 is slid toward the front side of the cylinder 18 due to the change of a pressure state in the air chamber 30 in accordance with the driving movement of the piston cylinder 18*a*, the striking member 27 collides with the intermediate member 29. An impact force of the intermediate member 29 flipped forward due to the collision with the striking member 27 is transmitted to the bit 20, so that a drilling performance in a drilling work can be improved.

The intermediate member 29 shown in the first embodiment has its mass larger than that of a related-art intermediate member. In accordance with the increase of the mass, a volume of the intermediate member 29 according to the first embodiment is increased more than that of the related-art intermediate member. As a method for increasing the volume of the intermediate member 29, may be considered a method for increasing an entire length by maintaining the diameter of the intermediate member 29 to the same dimension as that of the related-art intermediate member, and a method for enlarging a diameter by maintaining the entire length to the same dimension as that of the related-art intermediate member. The intermediate member 29 according to the first embodiment employs the method for enlarging the diameter by maintaining the entire length to the same dimension as that of the related-art intermediate member. In such a way, the entire length is maintained to the same dimension as that of the related-art intermediate member, an end part of the hammer drill 1 can be prevented from being long and the deterioration of maneuverability can be prevented.

On the other hand, since the diameter of the intermediate member 29 is enlarged more than that of the related-art intermediate member, the diameter of the cylinder 18 located in the intermediate member 29 side is enlarged more than the diameter of a related-art cylinder in accordance with the enlargement of the diameter. When the diameter of the cylinder 18 is enlarged as described above, the end of the hammer drill 1 is also enlarged so that the maneuverability of an operator may be possibly deteriorated. Therefore, in the hammer drill 1 according to the first embodiment, as shown in FIGS. 2 and 3, the ball bearing 14 having a bearing thickness smaller than that of a related-art ball bearing, more specifically, the ball bearing 14 with the small diameter of a bearing ball is used to support the cylinder 18 so as to freely rotate. Along therewith, a washer 34 that absorbs an impact force to the ball bearing 14 is provided at a part in which the cylinder 18 abuts on the ball bearing 14.

As described above, the cylinder 18 is supported under a state that the cylinder 18 can move forward and backward and freely rotate in the main body housing 2 by the ball bearing 14 and the slide bearing 16. When the drilling work is finished, the impact force of the striking member 27 and the intermediate member 29 is transmitted to the cylinder 18 and the impact force is transmitted to the main body housing 2 through the cylinder 18. Accordingly, in accordance with the movement of the striking member 27 and the intermediate member 29, the cylinder 18 moves slightly forward and backward, (for instance, a forward and backward movement of a distance of 0.8 mm shown in FIGS. 2A and 2B). An impact caused by the forward and backward movement of the cylinder 18 has been hitherto supported by the ball bearing 14 in a related-art structure.

However, in the hammer drill 1 according to the first embodiment, since the bearing thickness of the ball bearing 14 that supports the cylinder 18 is smaller than that of the related-art ball bearing, the impact caused by the forward and backward movement of the cylinder 18 is hardly supported only by the ball bearing 14. Accordingly, the washer 34 for absorbing the impact force to the ball bearing 14 is provided at the part in which the cylinder 18 abuts on the ball bearing 14, so that the impact of the cylinder 18 can be prevented from being directly transmitted to the ball bearing 14. Thus, even when the bearing thickness of the ball bearing is smaller than that of the related-art ball bearing, the impact can be sufficiently supported through the washer 34.

Especially, in the hammer drill 1 according to the first embodiment, the mass of the intermediate member 29 is increased more than that of the related-art intermediate member. The impact force applied to the ball bearing 14 through the cylinder 18 is increased in accordance with the increase of the mass of the intermediate member 29. Accordingly, the washer 34 is provided so that the increased impact can be adequately absorbed.

The enlarged dimension of the diameter of the cylinder 18 that is enlarged in accordance with the enlargement of the diameter of the intermediate member 29 is absorbed by using the ball bearing 14 having the small bearing thickness. Accordingly, the size of the end part of the hammer drill 1 can be maintained to the same size as that of a related-art hammer drill, and the same maneuverability and operability as those of the related-art hammer drill can be ensured.

Especially, in a tool employing a reciprocating mechanism that converts the rotating movement of the intermediate shaft 11 to the forward and backward movement of the piston cylinder 18*a* by using the connecting arm 25 as in the hammer drill 1 shown in the first embodiment, it is important to meet a request for miniaturizing the tool due to its structure. Accordingly, an effect realized by suppressing the extension and the enlarged diameter of the end part of the hammer drill 1 corresponds to a desire of a user using the tool and further leads to a great effect of suppressing the enlargement of the tool.

The driving tool according to the present invention is not limited only to the hammer drill 1 shown in the first embodiment. A driving tool that has a function of applying a rotating force and an impact force to a bit 20 and includes an intermediate member 29 for applying an impact force whose size needs to be enlarged more than that of a related-art intermediate member can employ the structure of the present invention. The driving tool employs the structure of the present invention so that the same effects as those shown in the first embodiment can be obtained.

Now, a driving tool according to a second embodiment of the present invention will be described below in detail by referring to FIGS. 4 to 8B.

In an ordinary hammer drill, a rotating force in an output shaft of a motor is transmitted to an intermediate shaft through a first gear to rotate the intermediate shaft, and further, a cylinder to which a bit is fixed is rotated through a second gear engaged with the intermediate shaft.

In the intermediate shaft, are provided a boss freely fitted to the intermediate shaft, a connecting arm attached so as to freely rotate along a groove part formed on the outer periphery of the boss under a state that an axis is inclined and a clutch that allows the intermediate shaft to engage with the boss so as to rotate the boss in accordance with the rotation of the intermediate shaft. When the intermediate shaft is rotated under a state that the clutch is connected to the intermediate shaft, the boss rotates correspondingly to the rotation of the intermediate shaft. Thus, the connecting arm provided in the outer periphery of the boss changes an inclined movement direction of a rod part of the connecting arm in accordance with the rotation of the boss, so that the end part of the rod part moves forward and backward along the extending direction of a cylinder in accordance with the change of the inclined movement of the rod part. A mechanism that converts a rotating movement to a forward and backward movement in accordance with such a movement of the connecting arm and the boss is referred to a reciprocating mechanism.

In the reciprocating mechanism, the rotating movement of the intermediate shaft is converted into the forward and backward movement through the connecting arm and a piston is driven correspondingly to the forward and backward movement so that an impact force can be applied to a bit.

On the other hand, in order to enhance an operating speed or improve operability in a drilling work, the impact force in the hammer drill needs to be improved. Therefore, a method is considered in which the pressure of an air chamber compressed in accordance with a driving operation of the piston is raised to increase the impact energy of a striking member. However, a large load is applied to the parts of the reciprocating mechanism such as the piston, the connecting arm and the boss due to the rise of the pressure of the air chamber, so that the connecting arm is broken.

In the driving tools that require a strong impact force, many driving tools use not the reciprocating mechanisms, but crank structures to generate the impact force. However, the driving tool using the crank structure is liable to have a device enlarged and a weight increased due to its structure. Thus, the maneuverability of the tool is deteriorated.

In the second embodiment, the driving tool will be described that uses the reciprocating mechanism and can improve its durability necessary for the impact force.

Figure 4:
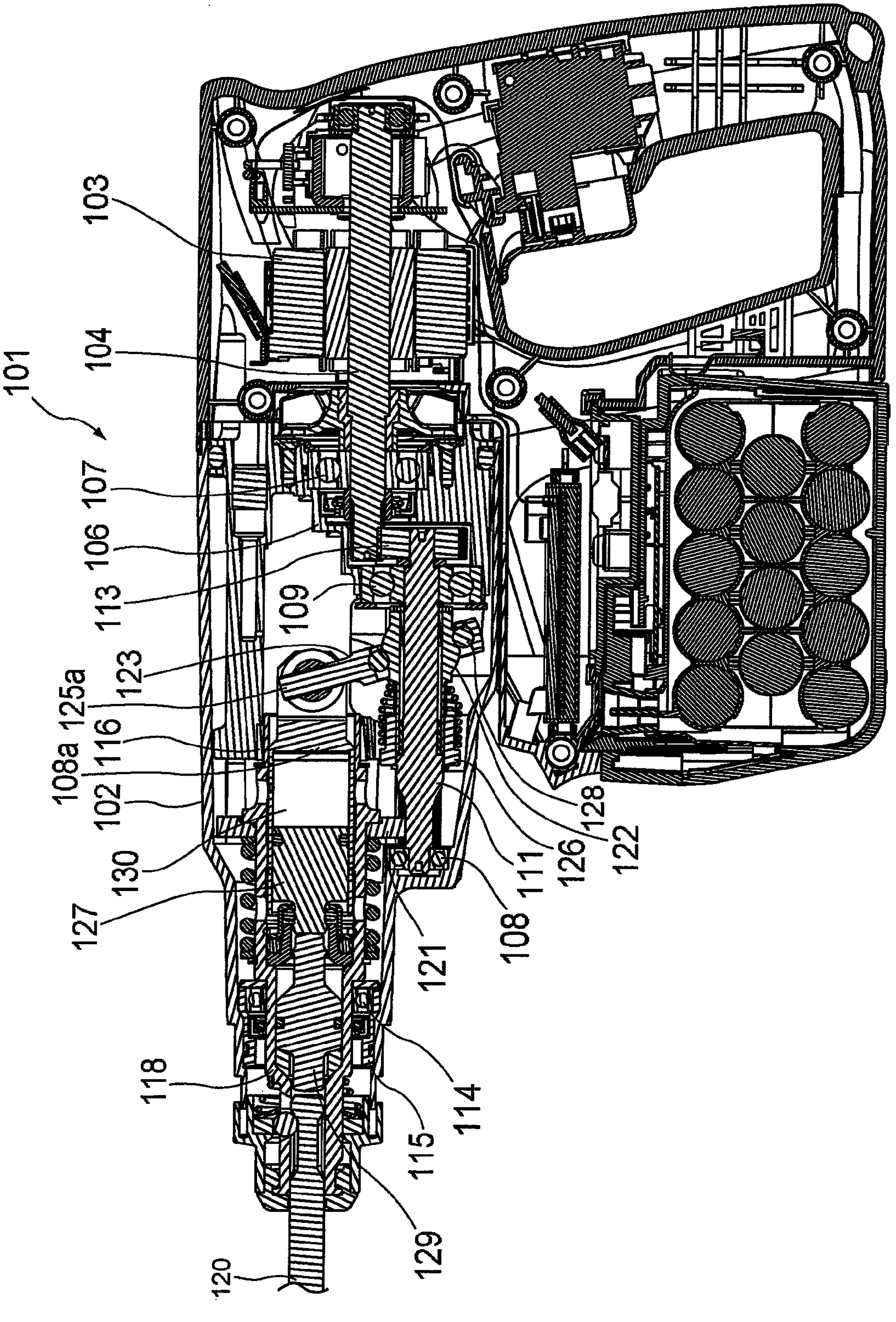
FIG. 4 is a side sectional view showing a hammer drill according to a second embodiment of the present invention.

FIG. 4 is a side sectional view showing a hammer drill 101 as one example of the driving tool according to the second embodiment. The basic structure of the hammer drill 101 according to the second embodiment is the same as that of the hammer drill 1 according to the first embodiment. Accordingly, an explanation of duplicated members will be omitted.

Figure 5A:
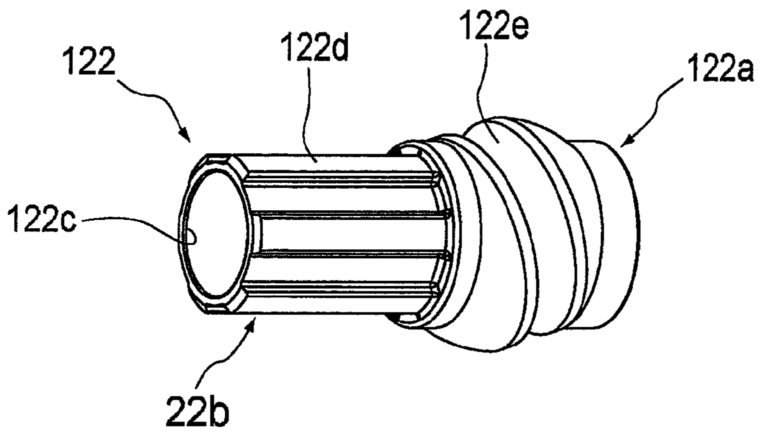
FIG. 5A is a perspective view of an external appearance of a boss.
Figure 5B:
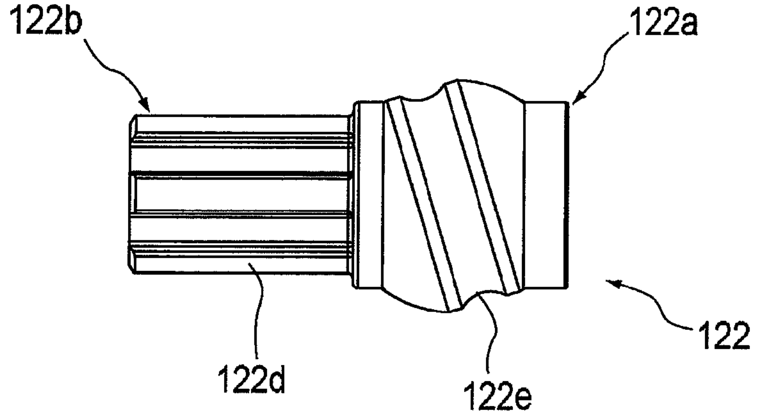
FIG. 5B is a side appearance view of the boss and FIG. 5C is a side sectional view of the boss.
Figure 5C:
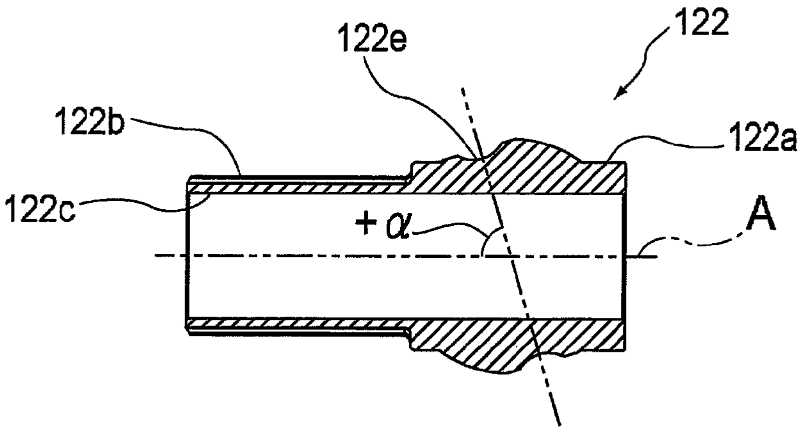

FIG. 5A is a perspective view of an external appearance of a boss 122. FIG. 5B is a side external appearance view of the boss 122. FIG. 5C is a side sectional view of the boss 122.

The boss 122 has a boss main body part 122*a* and an engaging part 122*b* formed integrally therewith. The engaging part 122*b* is a part engaged with a clutch 126. As shown in FIGS. 5A to 5C, many engaging grooves 122*d* are formed along the axial direction A of a through hole 122*c* through which an intermediate shaft 111 is allowed to pass. Clutch pawls of the clutch 126 are engaged with the engaging grooves 122*d* to rotate and drive the boss 122 in accordance with the rotation of the intermediate shaft 111.

The boss main body part 122*a* has an annular structure (a doughnut form) including a substantially semispherical section gently protruding to an outer peripheral direction. On the outer surface of the substantially semispherical section of the annular structure, a semispherical recessed groove (a first groove part) 122*e* is formed that is inclined by an angle $\alpha$ with respect to the axial direction A of the through hole 122*c*. The semispherical recessed groove 122*e* can be filled with a steel ball (bearing) 128. Further, to the semispherical recessed groove 122*e*, a connecting arm 123 is attached that can rotate and move in the extending direction of the semispherical recessed groove 122*e* by using the steel ball 128.

Figure 6A:
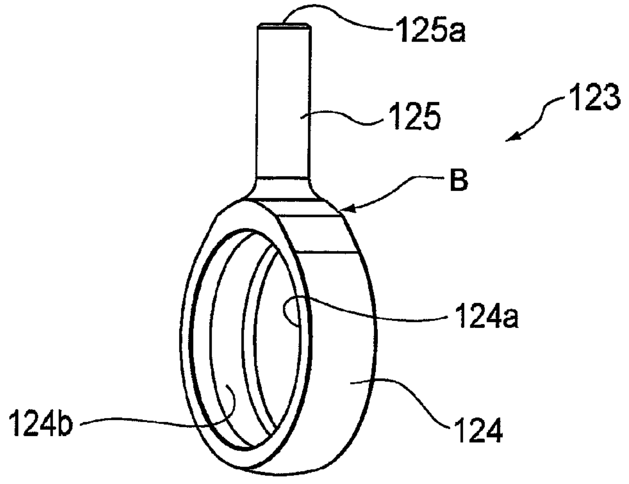
FIG. 6A is a perspective view of a connecting arm.
Figure 6B:
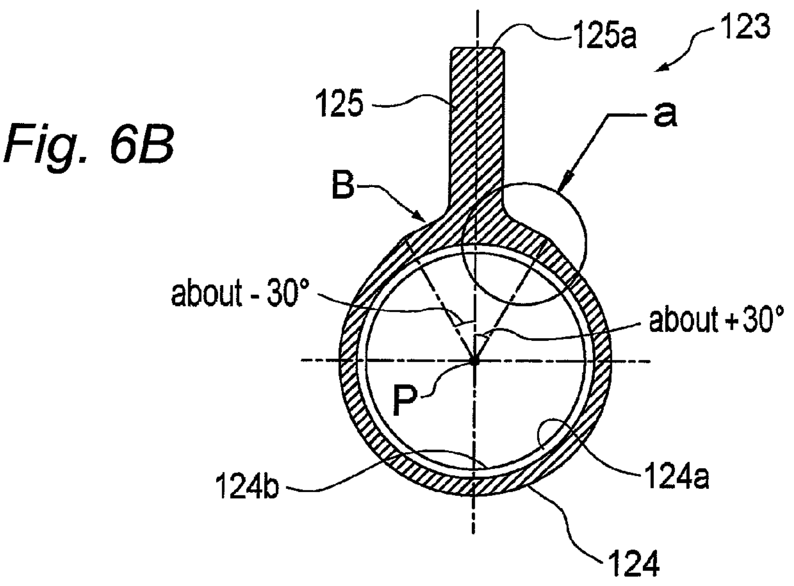
FIG. 6B is a vertical sectional view of the connecting arm and FIG. 6C is a partly enlarged view of a part "a" shown in FIG. 6B.
Figure 6C:
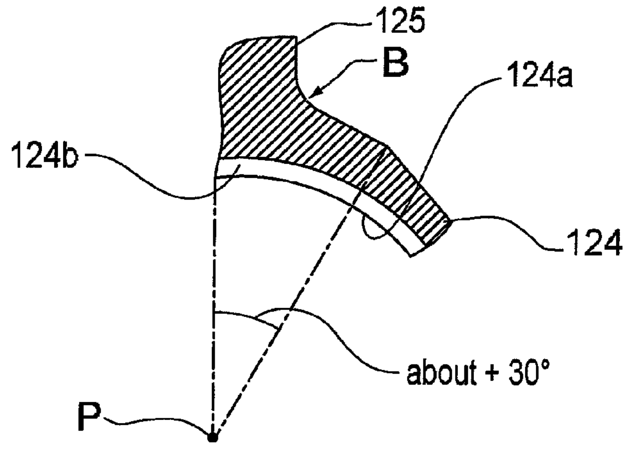

FIG. 6A is a perspective view of the connecting arm 123, FIG. 6B is a vertical sectional view of the connecting arm 123 and FIG. 6C is a partly enlarged sectional view with a part "a" shown in FIG. 6B enlarged.

In the connecting arm 123, a connecting arm main body part 124 formed in a ring shape and a rod part 125 extending upright on the outer peripheral surface of the connecting arm main body part 124 that are formed integrally. The connecting arm main body part 124 has a ring form and a groove part (a second groove part) 124*b* is formed in its inner surface in which the steel ball 128 is provided. The rod part 125 is extended upright from the outer peripheral surface of the connecting arm main body part 124. An angle of the central axis of the rod part 125 is prescribed so that the central axis passes through the center P of a ring opening 124*a* (a circular opening part) formed in the connecting arm main body part 124 as shown in FIG. 6B.

The connecting arm 123 allows the boss 122 to pass through the ring opening 124*a* of the connecting arm main body part 124. The steel ball 128 is fitted to a part between the semispherical recessed groove 122*e* of the boss main body part 122*a* and the groove part 124*b* of the connecting arm main body part 124 so that the connecting arm 123 is smoothly rotated and driven relative to the boss 122.

The semispherical recessed groove 122*e* of the boss main body part 122*a* is formed under a state that the semispherical recessed groove 122*e* is inclined at the angle of a with respect to the axial direction A of the through hole 122*c*. Accordingly, when the boss 122 is rotated and driven in accordance with the rotation of the intermediate shaft 111, the inclined angle of the connecting arm 123 is changed correspondingly to the inclined angle of the semispherical recessed groove 122*e*.

Figure 7B:
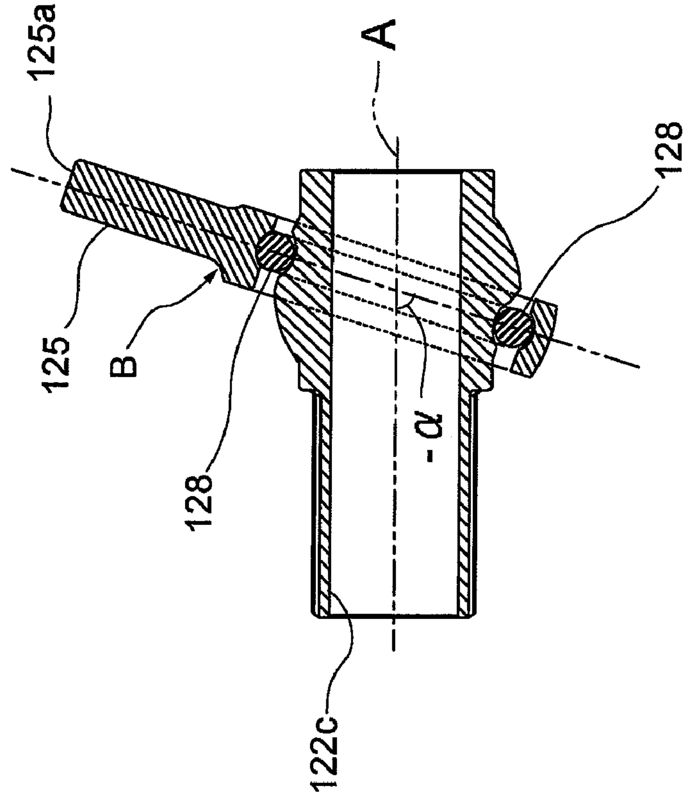
FIG. 7A is a side sectional view showing a state that the connecting arm is inclined at an angle of $+\alpha$ relative to the boss and FIG. 7B is a side sectional view showing a state that the connecting arm is inclined at an angle of $-\alpha$ relative to the boss.
Figure 7A:
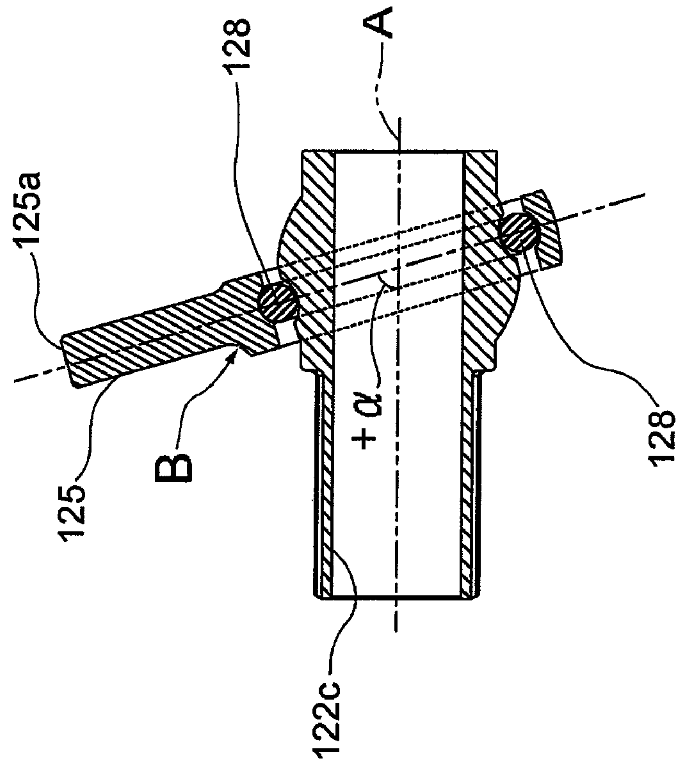
Figure 8A:
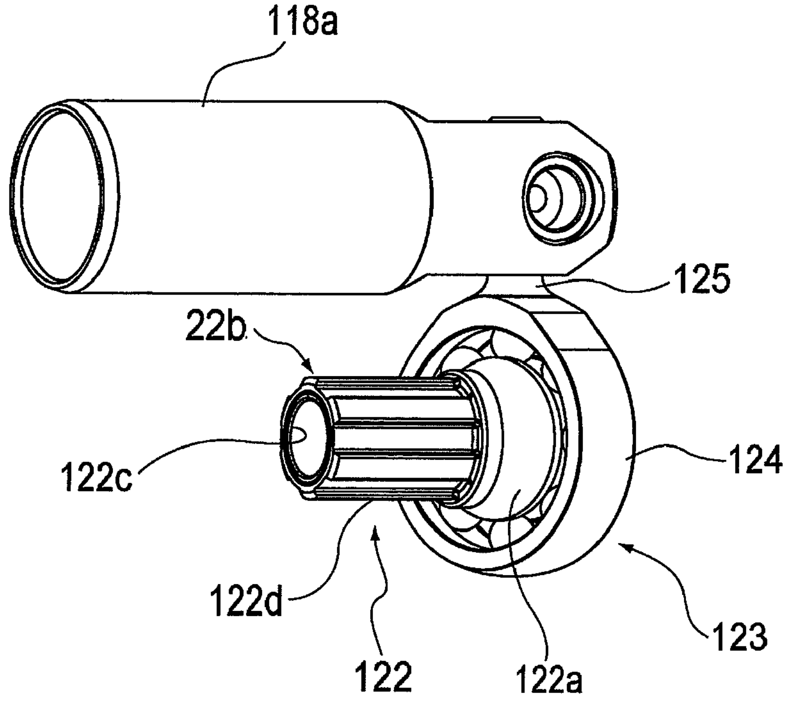
FIG. 8A is a perspective view showing a connecting relation of the boss, the connecting arm and a piston cylinder.
Figure 8B:
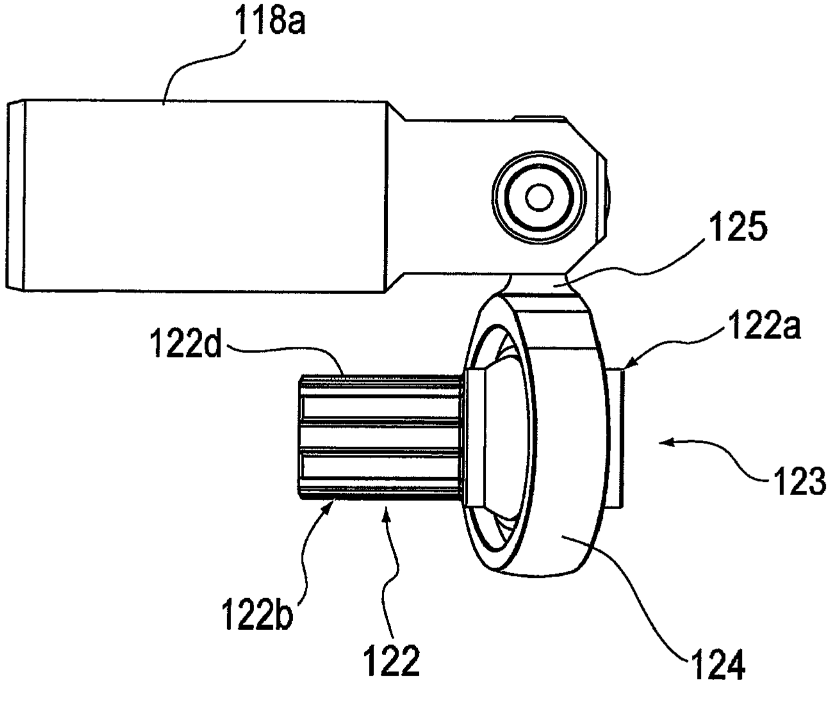
FIG. 8B is a side view thereof.

FIG. 7A shows a state that the semispherical recessed groove 122*e* is inclined by an angle $+\alpha$ with respect to the axial direction of the through hole 122*c*. In this case, since the rod part 125 located in an upper surface side is inclined and moved to forward, an end 125*a* of the rod part 125 is moved forward. On the other hand, FIG. 7B shows a state that the semispherical recessed groove 122*e* is inclined by an angle $-\alpha$ with respect to the axial direction of the through hole 122*c*. In this case, since the rod part 125 located in the upper surface side is inclined and moved rearward, the end 125*a* of the rod part 125 is moved rearward.

The inclined angle of the connecting arm 123 is changed in accordance with the rotation of the intermediate shaft 111. The end 125*a* of the rod part 125 is moved forward and backward in forward and backward directions in accordance with the change of the inclined angle of the connecting arm 123. Accordingly, as described below, a piston cylinder 118*a* (see FIGS. 4 and 8A and 8B) that is provided in parallel with the intermediate shaft 111 and capable of moving forward and backward is connected to the end 125*a* of the rod part 125. Thus, the rotating movement of the intermediate shaft 111 can be converted into the forward and backward movement through the boss 122 and the connecting arm 123. A mechanism that converts the rotating movement into the forward and backward movement through the inclined movement of the connecting arm 123 as described above is referred to as a reciprocating mechanism.

In the ring opening 124*a* of the connecting arm main body part 124, as shown in FIG. 6B, an opening is formed so as to maintain an equal distance from the center of the through hole 122*c*. On the other hand, a thickness from the ring opening 124*a* to an outer peripheral part in the connecting arm main body part 124 is maintained to a constant thickness in a part except a range of about ±30° from an attached position of the rod 125 of the connecting arm main body part 124 by considering the center P of the ring opening 124*a* to be a reference.

On the other hand, in the above-described range of about ±30° from the attached position of the rod 125 as a reference, the thickness is reinforced so that the thickness from the ring opening 124*a* to the outer peripheral part is increased more than that of other part. Therefore, at a position in the connecting arm main body part 124 where the rod part 125 is provided upright, more specifically, in the boundary part of a connecting position B of the connecting arm main body part 124 and the rod part 125, the thickness is concentrically reinforced. Thus, even when the rotating movement of the intermediate shaft 111 is converted into the forward and backward movement in the end of the rod part 125 by the inclined movement of the connecting arm main body part 124 and a load is applied to the connecting position B of the connecting arm main body part 124 and the rod part 125, a damage due to a metallic fatigue such as cracks caused by the load can be prevented from early occurring in the connecting position B.

When the rotating movement of the intermediate shaft 111 is converted into the forward and backward movement in the end 125*a* of the rod 125, a strength enough for enduring the load applied to the connecting position B of the connecting arm main body part 124 and the rod part 125 can be ensured by the reinforcement of the thickness. Accordingly, even when the rotating speed of the intermediate shaft 111 is increased or the mass of a below-described striking member 127 (see FIG. 4) is increased to enhance an impact force, the load applied to the connecting position B of the connecting arm main body part 124 and the rod part 125 can be sufficiently supported to provide an adequate durability.

As shown in FIG. 6C, the thickness is reinforced only in the range of about ±30° from the attached position of the rod part 125 as the reference. However, in a range except the range of about ±30°, the thickness is not reinforced. Therefore, the increase of weight of the connecting arm 123 itself is suppressed to a minimum value as much as possible and an effective reinforcement in the connecting arm 123 can be realized.

In the hammer drill 101 according to the second embodiment, the material of the connecting arm 123 and the boss 122 is changed from a usually employed tempering material to a cemented material higher in its hardness. Thus, a thermal treatment at the time of molding the connecting arm 123 and the boss 122 is changed to a process for the cemented material from a process for the tempering material in accordance with the change of the material to improve a surface hardness. Accordingly, not only the strength of the connecting position B of the connecting arm 123, but also the strength of the connecting arm 123 itself and the boss 122 itself can be improved. Accordingly, when the rotation of the intermediate shaft 111 is transmitted to the connecting arm 123 from the boss 122, a load applied to the semispherical recessed groove 122*e* of the boss main body part 122*a* and the groove part 124*b* of the connecting arm main body part 124 through the steel ball 128 can be sufficiently supported by the boss main body part 122*a* and the connecting arm main body part 124 and an adequate durability can be ensured.

Accordingly, the semispherical recessed groove 122*e* of the boss main body part 122*a* or the groove part 124*b* of the connecting arm main body part 124 can be restrained from being worn by the load, so that a smooth rotation of the steel ball 128 can be maintained.

The end 125*a* of the rod part 125 of the connecting arm 123 is attached to a rear end of the piston cylinder 118*a* provided in a cylinder 118 as shown in FIG. 4. In the piston cylinder 118*a*, the striking member 127 is accommodated so as to freely slide through an air chamber 130. Further, in an inner part of a front end of the cylinder 118 in front of the striking member 127, an intermediate member 29 is accommodated that applies an impact force to a bit 120 in accordance with a collision with the striking member 12. The air chamber 130, the striking member 127 and the intermediate member 129 form an impact applying unit according to the present invention.

When the end 125*a* of the rod part 125 of the connecting arm 123 starts the forward and backward movement, the driving movement of the piston cylinder 118*a* is started to start a sliding movement of the striking member 127 in accordance with the forward and backward movement of the end 125*a* of the rod part 125. When the striking member 127 is slid and moved toward the front side of the cylinder 118 due to the change of a pressure state in the air chamber 130 in accordance with the driving movement of the piston cylinder 118*a*, the striking member 127 collides with the intermediate member 129. An impact force of the intermediate member 129 flipped forward due to the collision with the striking member 127 is transmitted to the bit 120, so that a drilling performance in a drilling work can be improved.

The driving tool according to the present invention is not limited only to the hammer drill 101 shown in the second embodiment. A driving tool that has a function of applying a rotating force and an impact force to a bit 120 and includes a mechanism for converting the rotating force to the impact force by using the reciprocating mechanism can employ the structure of the present invention. Further, the driving tool employs the structure of the present invention so that the same effects as those shown in the second embodiment can be obtained.

Now, a driving tool according to a third embodiment will be described in detail by referring to FIGS. 9 to 12.

Figure 12:
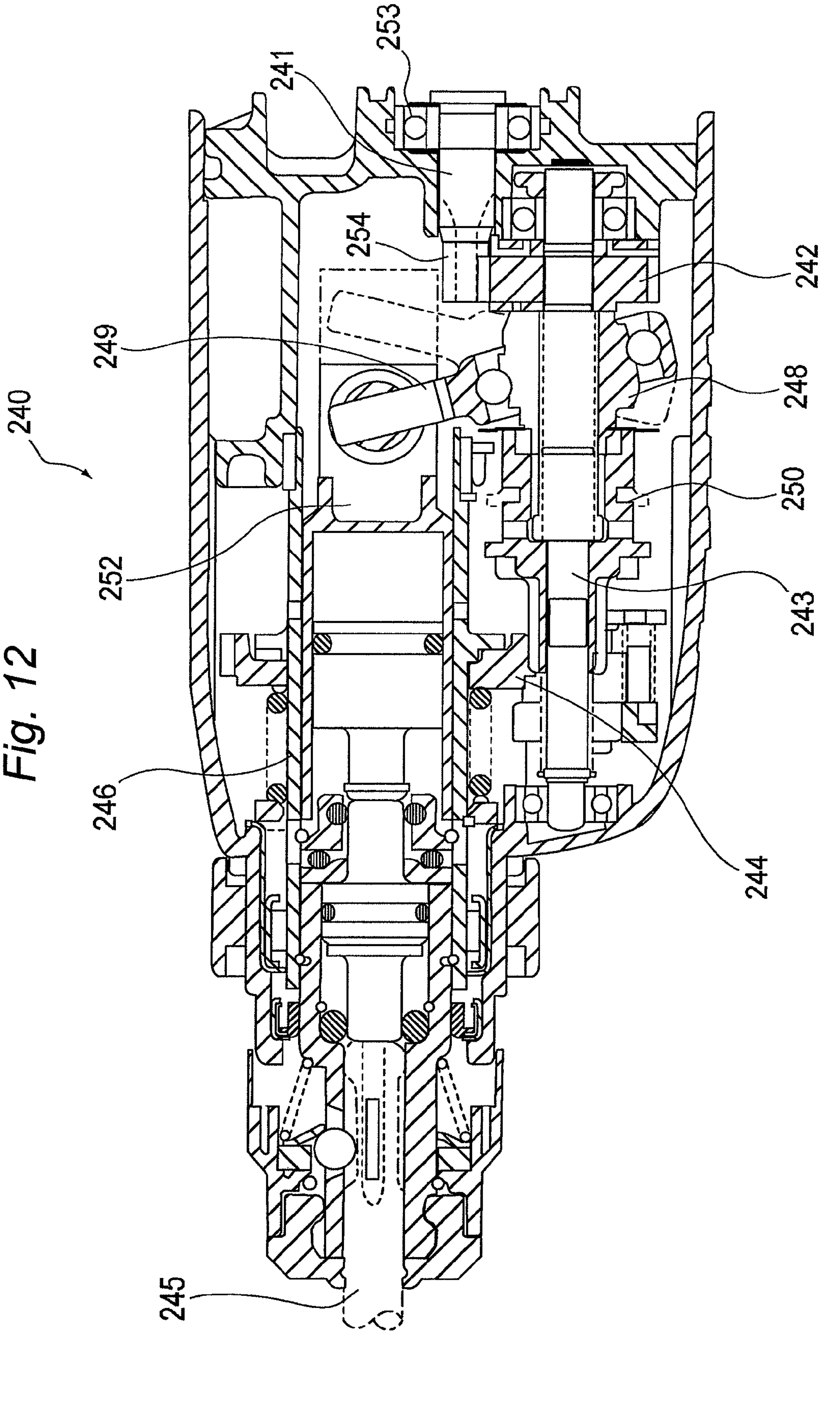
RELATED ART Fig. 12
FIG. 12 is a side sectional view showing a schematic structure of a related-art hammer drill.

As shown in FIG. 12, since a related-art hammer drill 40 has a structure in which an impact force is applied to a bit 45, an impact is transmitted to parts in a tool by a vibration caused by the impact force or a vibration and impact transmitted to the tool through the bit 45 when concrete is actually ground. Accordingly, the damage of a ball bearing 53 that supports the output shaft 41 so as to freely rotate or the abrasion of a toothed surface of a first gear 42 engaging with the output shaft 41 arise.

The output shaft 41 of a motor needs to be firmly supported so as not to move (vibrate) the output shaft 41 of the motor to such an impact force. However, in the related-art hammer drill using a reciprocating mechanism, an inner structure of a tool hardly has a spatial room. Accordingly, a member for suppressing the vibration of the output shaft 41 is not easily disposed.

Especially, in the hammer drill 40, a gear 54 directly engaging with the first gear 42 is directly formed at the end of the output shaft 41 (the gear 54 is directly formed at the end of the output shaft 41) so that a dimension from the motor to the attaching position of the bit 45 is designed to be at least decreased. Therefore, it is more difficult to dispose the member for suppressing the vibration of the output shaft 41.

On the other hand, there is a fear that grease low is filled in its viscosity with which a part where a cylinder 46 is arranged or a part where an intermediate shaft 43 is arranged may possibly enter a position where the motor is disposed.

In order to prevent the entry of the grease, an oil seal is preferably provided in a part near the end position of the output shaft 41. However, since there is no room in a space for providing the oil seal, the oil seal is hardly provided. This problem is more outstanding in the hammer drill 40 provided with the output shaft 41 having the gear 54 directly formed at the end.

In the driving tool according to the third embodiment of the present invention, a gear is directly formed in an output shaft of a motor and the output shaft can be firmly supported so that the output shaft of the motor does not easily move. Further, the driving tool can prevent the entry of grease at the end position of the output shaft of the motor.

Figure 9:
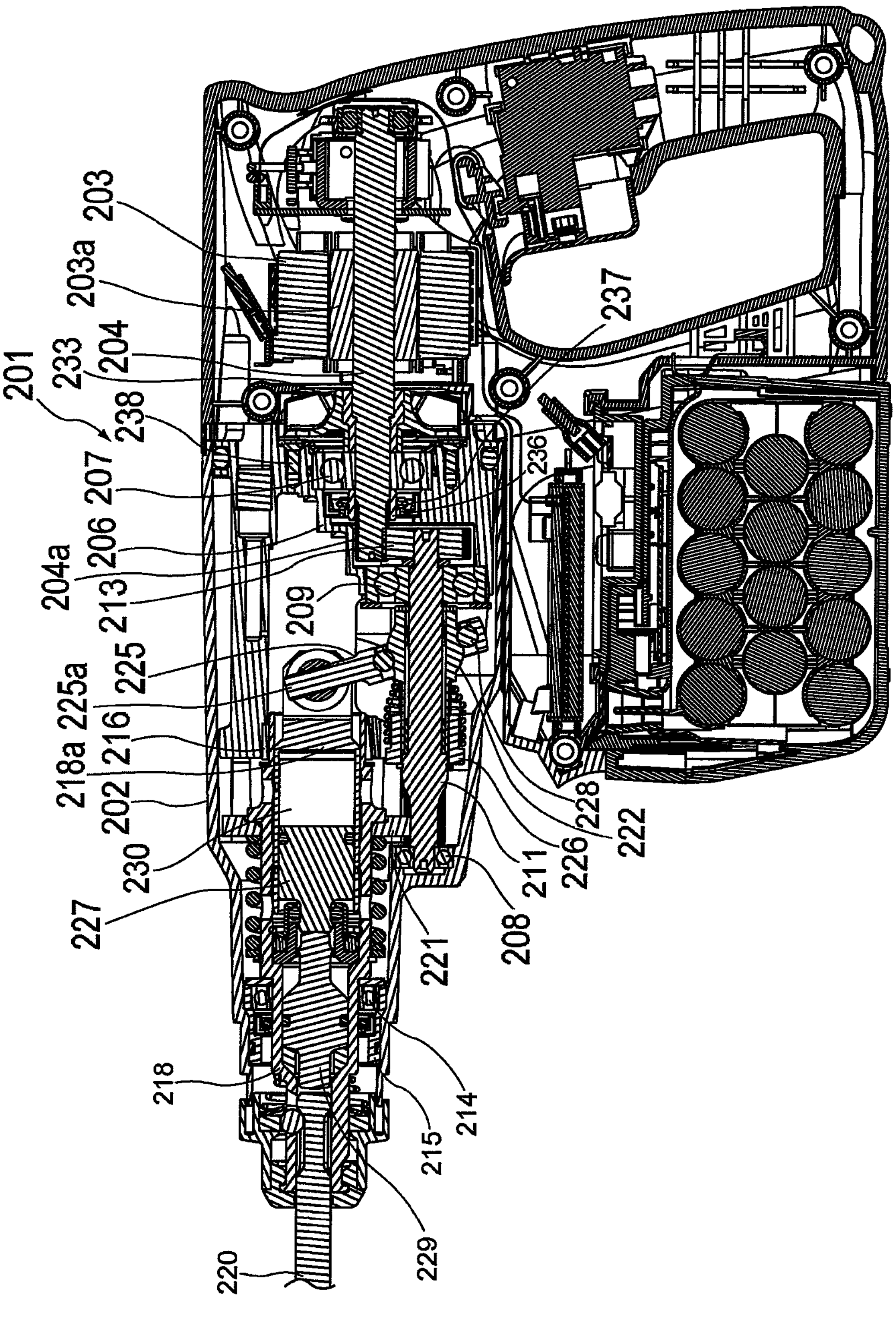
FIG. 9 is a side sectional view showing a hammer drill according to a third embodiment of the present invention.

FIG. 9 is a side sectional view showing a hammer drill 201 as one example of the driving tool according to the third embodiment. Since the basic structure of the hammer drill 201 according to the third embodiment is the same as that of the hammer drill 1 according to the first embodiment, an explanation of duplicated members will be omitted.

In an end part of an output shaft 204, a gear 204*a* engaging with a below-described first gear 213 is directly formed in the output shaft 204. A detailed structure of a part near a position where a ball bearing 207 is disposed relative to the output shaft 204 will be described below.

A second gear 221 and a cylinder 218 serve as rotating and driving units.

Figure 10A:
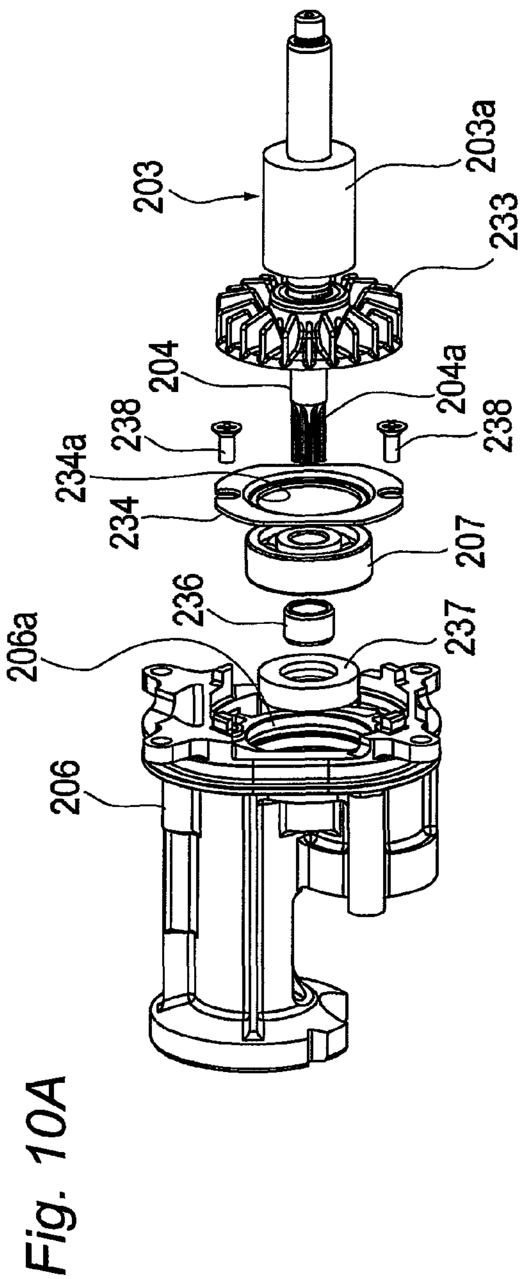
FIG. 10A is a developed perspective view showing an attached state of a motor to an inner housing.
Figure 10B:
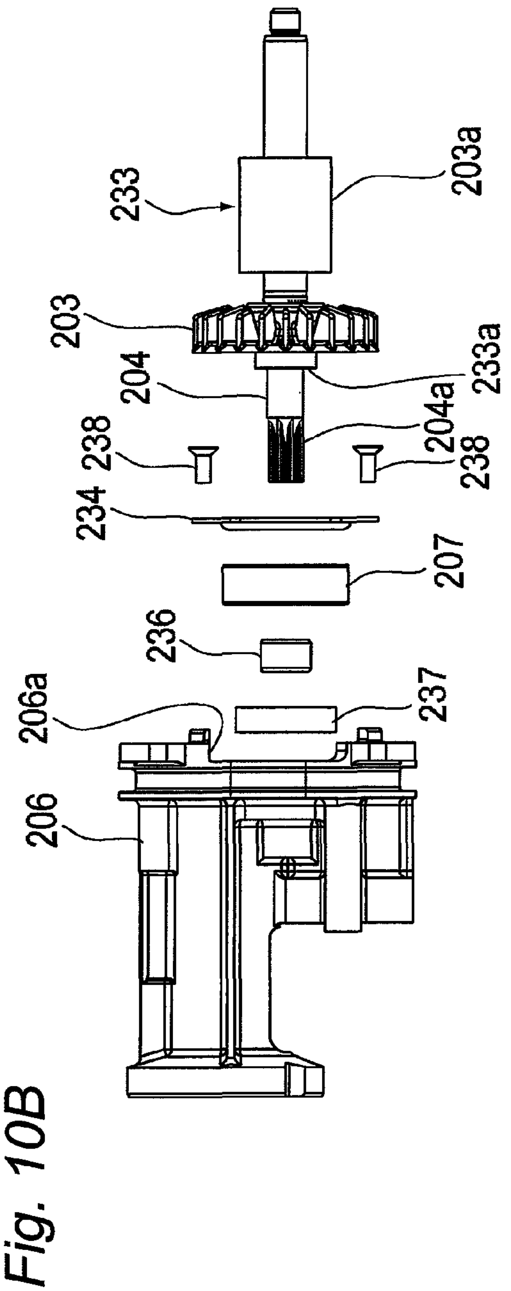
FIG. 10B is a developed side view thereof.
Figure 11:
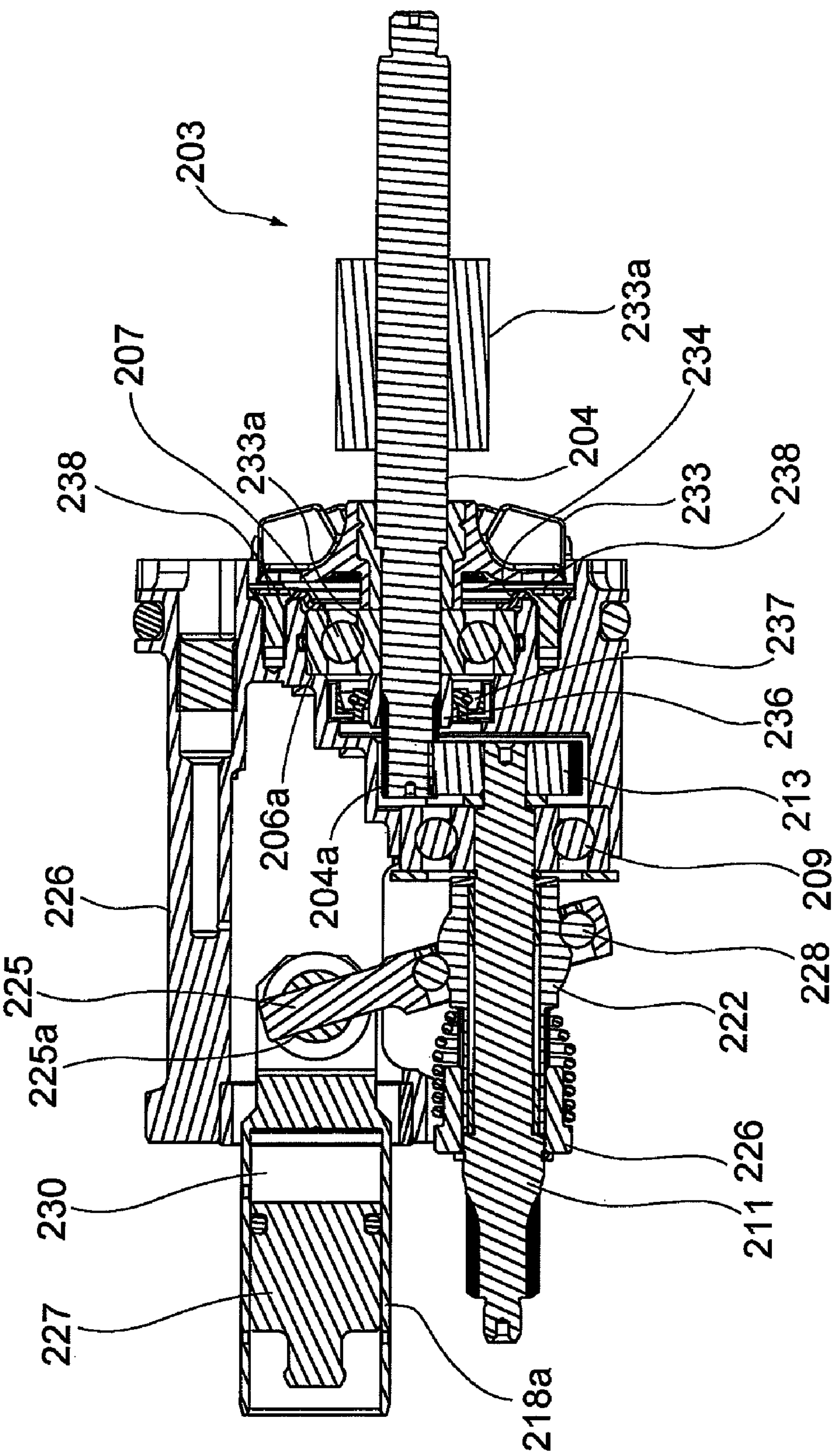
FIG. 11 is a side sectional view showing an attached state of the motor, the inner housing, an intermediate shaft, a clutch, a boss, a connecting arm and a piston cylinder.

FIG. 10A is a developed perspective view showing an attached state of a motor 203 to an inner housing 206. FIG. 10B shows a developed side view thereof. FIG. 11 is a side sectional view showing an attached state of the motor 203, the inner housing 206, an intermediate shaft 211, a clutch 226, a boss 222, a connecting arm 225 and a piston cylinder 218*a*.

In the output shaft 204 of the motor 203, the gear 204*a* is directly formed (directly cut) at the end part thereof. To a position near a rotor 203*a* of the output shaft 204, a cooling fan 233 for cooling the motor 203 is fixed. In a front side position of the cooling fan 233, the ball bearing 207 is provided through a plate 234. In a further front side position of the cooling fan 233, a sleeve 236 is pressed to and fixed to the output shaft 204.

A front end part 233*a* of the cooling fan 233 is made to abut on the rear end part of the ball bearing 207 through an opening part 234*a* of the plate 234. As shown in FIG. 11, the sleeve 236 is provided so as to cover only a part of the gear groove of a rear end part of the gear 204*a*. An oil seal 237 is fitted to an outer peripheral part of the sleeve 236.

Under a state that the cooling fan 233, the plate 234, the ball bearing 207, the sleeve 236 and the oil seal 237 are attached to the output shaft 204, the output shaft 204 is inserted into an opening part 206*a* for the output shaft of the inner housing 206. Under a state that the sleeve 236, the oil seal 237 and the ball bearing 207 are internally provided in the opening part 206*a* for the output shaft, the plate 234 is fixed to the edge part of the opening part 206*a* for the output shaft by screws 238. The plate 234 is fixed to the inner housing 206, so that the gear 204*a* at the end of the output shaft 204 is engaged with the first gear 213 located in a front side of a lower part of the inner housing 206 as shown in FIG. 11. Along therewith, between the gear 204*a* of the output shaft 204 and the ball bearing 207 for supporting the output shaft 204 so as to freely rotate, the oil seal 237 is disposed through the sleeve 236. Accordingly, the grease that tries to enter the motor 203 side through the engaging part of the first gear 213 can be blocked by the oil seal 237.

The ball bearing 207 is internally provided in the inner housing 206 under a state that a rear end part is regulated by the plate 234 fixed by the screws 238. Accordingly, the ball bearing 207 is positioned in the inner housing 206 and is not moved backward in the extending direction of the output shaft 204. Under such a state, the sleeve 236 is pressed into and fixed to the front surface side of the ball bearing 207. Therefore, even when the output shaft 204 tries to move backward, the rear end (a rear surface part) of the sleeve 236 abuts on the front surface part of the ball bearing 207 to regulate the backward movement of the output shaft 204. On the other hand, since the front end part 233*a* of the cooling fan 233 is allowed to abut on the rear end part of the ball bearing 207, even when the output shaft 204 tries to move forward, the forward movement of the output shaft 204 is regulated.

In the hammer drill 201 according to the third embodiment, the output shaft 204 is disposed in the inner housing 206 under a state that the ball bearing 207 is sandwiched between the sleeve 236 and the cooling fan 233. Therefore, the backward movement of the output shaft 204 can be regulated by the abutment of the sleeve 236 on the ball bearing 207. The forward movement of the output shaft 204 can be regulated by the abutment of the cooling fan 233 on the ball bearing 207.

Even when a vibration caused by a sliding movement of a striking member 227 and an intermediate member 229 or a vibration inputted through a bit 220 is transmitted to the output shaft 204, the output shaft 204 can be prevented from simply moving forward or backward. Accordingly, the damage of the ball bearing 207 or the abrasion of the toothed surface of the first gear 213 caused by the movement of the output shaft 204 can be suppressed.

Since the sleeve 236 is fitted so as to cover only a part of the gear grove of the rear end part of the gear 204*a*, under a state that the length of the output shaft 204 maintains a short dimension similarly to that of a related-art output shaft, the oil seal 237 can be disposed between a position where the gear 204*a* of the output shaft 204 is engaged with the first gear 213 and a position where the ball bearing 207 is disposed in the output shaft 204. Accordingly, a dimension from the motor 203 to the attached position of the bit 220 can be decreased similarly to that of the related-art hammer drill.

The oil seal 237 can be arranged between the engaging position of the first gear 213 with the gear 204*a* and the position where the ball bearing 207 is provided in the output shaft 204. Accordingly, the grease can be effectively prevented from entering the motor 203 side from the engaging position of the first gear 213.

The driving tool according to the present invention is not limited only to the hammer drill 201 shown in the above-described third embodiment. For instance, a driving tool having a gear engaging with a first gear that is directly formed (directly cut) at the end of an output shaft of a motor may employ the structure according to the present invention. Further, when the driving tool employs the structure according to present invention, the same effects as those shown in the third embodiment can be obtained.

What is claimed is:

1. A driving tool comprising:

a main body housing forming an external appearance of the driving tool;

a cylinder provided so as to freely rotate relative to the main body housing by a ball bearing and freely move forward and backward through a slide bearing;

a rotation and driving transmitting unit which drives to rotate the cylinder in accordance with a rotating movement of a motor;

a forward and backward driving converting unit which converts the rotating movement of the motor into a forward and backward movement in an extending direction of the cylinder by using a reciprocating mechanism;

a piston cylinder which is driven to move forward and backward in the extending direction by the forward and backward driving converting unit;

a striking member which moves forward and backward in the cylinder in accordance with the forward and backward movement of the piston cylinder; and an intermediate member which transmits an impact force by the striking member to a bit provided at an end of the cylinder from an inner part of the cylinder, wherein a diameter of the intermediate member is enlarged to increase a mass of the intermediate member, an outside diameter of the cylinder at a position where the intermediate member is internally provided is enlarged in accordance with an enlargement of the diameter of the intermediate member, a bearing thickness of the ball bearing is reduced correspondingly to a dimension of the enlarged outside diameter of the cylinder, and a washer is provided at a part where the ball bearing abuts on the cylinder in the forward and backward moving direction of the cylinder.

2. The driving tool according to claim 1, wherein the ball bearing supports an output shaft of the motor so as to freely rotate, and wherein a sleeve is fixed to the output shaft and the sleeve is abutted on a front surface part of the ball bearing.

3. The driving tool according to claim 2, wherein an oil seal is provided on the sleeve.

* * * * *